United States Patent [19]

Pandolfi

[11] Patent Number: 4,540,288
[45] Date of Patent: Sep. 10, 1985

[54] APPARATUS FOR PRODUCING ICE CREAM UTILIZING THE PELTIER EFFECT

[75] Inventor: Alberto Pandolfi, Milan, Italy

[73] Assignee: Brevetti Gaggia S.p.A., Milan, Italy

[21] Appl. No.: 634,417

[22] Filed: Jul. 25, 1984

[30] Foreign Application Priority Data

Aug. 1, 1983 [IT] Italy .................... 53616/83[U]
Nov. 22, 1983 [IT] Italy .................... 53964/83[U]
Nov. 22, 1983 [IT] Italy .................... 53965/83[U]

[51] Int. Cl.³ .............................................. A23G 9/00
[52] U.S. Cl. ...................................... 366/145; 62/342; 366/149; 99/455
[58] Field of Search ............... 366/144, 145, 147, 149; 62/342, 233, 343; 99/452, 453, 455

[56] References Cited

U.S. PATENT DOCUMENTS 4,450,692 5/1984 Sharpe et al. ...................... 62/342 X

FOREIGN PATENT DOCUMENTS 1981857 11/1967 Fed. Rep. of Germany .

*Primary Examiner*—Timothy F. Simone
*Attorney, Agent, or Firm*—Pearne, Gordon, Sessions, McCoy, Granger & Tilberry

[57] ABSTRACT

An ice-cream making machine has a container (3) for the ice cream and a motor-driven stirrer (4) located within the container (3), which is cooled by Peltier effect thermo-elements (8) each having a flat side in contact with a wall of the container (3) and an opposite flat side in contact with a heat dissipation member (9). The Peltier effect thermo-elements (8) are located between the bottom wall of the container (3) and the heat dissipation member and the lower surface of the container bottom wall has raised flat surface portions (11) in correspondence with the thermo-elements (89; the heat dissipation member has flat surface zones (9b) in contact with the thermo elements (8), and the surface area of each of the raised flat surface portions (11) and each of the said flat contact zones (9b) are at least equal to the surface area of each side of each Peltier effect thermo element (8).

21 Claims, 6 Drawing Figures

APPARATUS FOR PRODUCING ICE CREAM UTILIZING THE PELTIER EFFECT

This invention relates to an ice cream making machine of the type comprising
a container for the ice cream, having a bottom wall
a stirrer located within the container,
means for rotating the stirrer,
a refrigeration unit, including
heat dissipation means, and
a plurality of peltier effect thermo-elements
each having a flat side in contact with a wall of the container and an opposite flat side in contact with the heat dissipation means.

An ice cream making machine of the type specified above is described and illustrated in German Utility Model No. 1,981,857. This known ice cream making machine has a plurality of Peltier effect thermo-elements, angularly equi-distant from each other and disposed in contact with the side wall of the container for the ice cream. The face of each Peltier effect element opposite that which is in contact with the container is in contact with a heat dissipation member constituted by a metal element having a series of vanes over which flows a current of cooling air produced by a motor-driven fan.

The said known solution means that the ice cream making machine has a relatively large horizontal bulk and does not ensure perfect contact between the two opposing sides of each Peltier effect thermo-element with the container wall and the heat dissipation member respectively, which does not allow a high performance to be obtained from the machine.

The object of the present invention is to provide an ice cream making machine of the type specified at the beginning of the present description, which is particularly adapted for domestic use and is able to avoid the said disadvantages of the known solution mentioned above.

According to the invention, an ice cream making machine of the type specified at the beginning of the present description is provided which is characterised in that the Peltier effect thermo-elements are located between the lower surface of the bottom wall of the container and the said heat dissipation means, in that the lower surface of the bottom wall of the container has a plurality of raised flat surface portions, in correspondence with the Peltier effect thermo-elements, and in that the heat dissipation means include a heat dissipation member having a surface including a plurality of flat zones in contact with the Peltier effect thermo-elements, the surface of each of the said raised flat surface portions and each of the said flat contact zones corresponding at least to to the surface of each side of each Peltier effect thermo-element.

Preferably the heat dissipation member is connected to the container so as to be slidable in a direction perpendicular to the bottom wall of the container, and resilient means are provided for pressing the heat dissipation member against the bottom wall of the container so as to clamp the said Peltier effect thermo-elements between the raised flat surface portions and the heat dissipation member.

Thus perfect contact is ensured between the two sides each Peltier effect thermo-element and the bottom wall of the container for the ice cream and the heat dissipation member.

In a preferred embodiment, which has a particularly simple and cheap construction, the heat dissipation member is slidable on a plurality of pins projecting beneath the raised flat surface portions and the resilient means are constituted by a series of helical springs each located on a respective pin between a lower enlarged end of the latter and an abutment surface of the heat dissipation member.

Preferably the pins are constituted by bolts having one end screwed into a corresponding threaded hole in the bottom wall of the container and having at its opposite end a head against which the respective helical spring bears.

The heat dissipation member, according to a first embodiment, has an internal cavity through which a coolant fluid flows. In a second embodiment the heat dissipation member is constituted by an element having a plurality of fins over which a current of cooling air is forced by a motor-driven fan. In a third embodiment, the heat dissipation member has an associated cooling unit including a pump which supplies a coolant liquid from a reservoir to spray nozzles facing the heat dissipation member.

Further characteristics and advantages of the invention will become apparent from the following description with reference to the appended drawings, provided purely by way of non-limiting example, in which.

Figure 1:
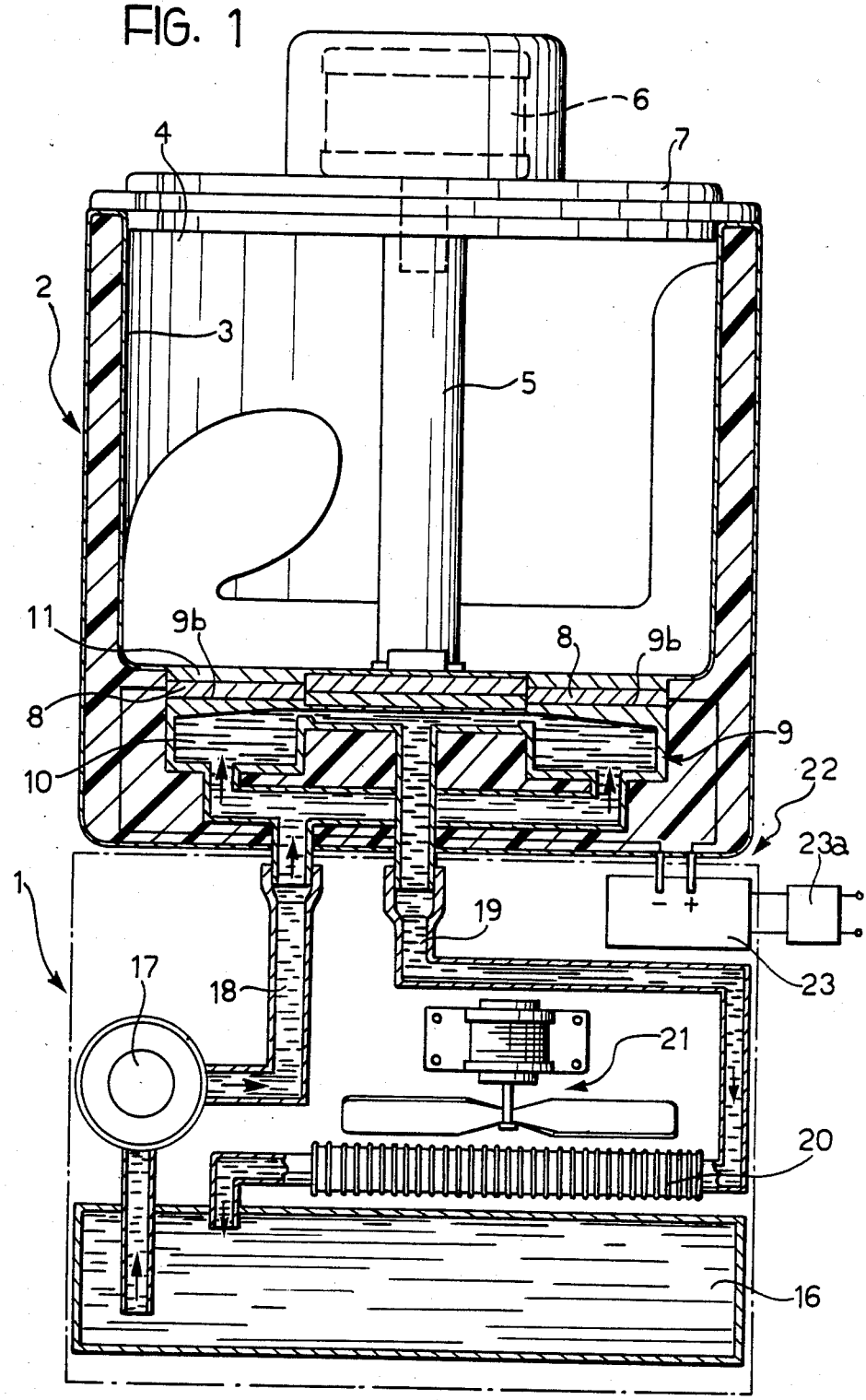
FIG. 1 is a sectional view of a first embodiment of the ice cream making machine according to the invention.
Figure 2:
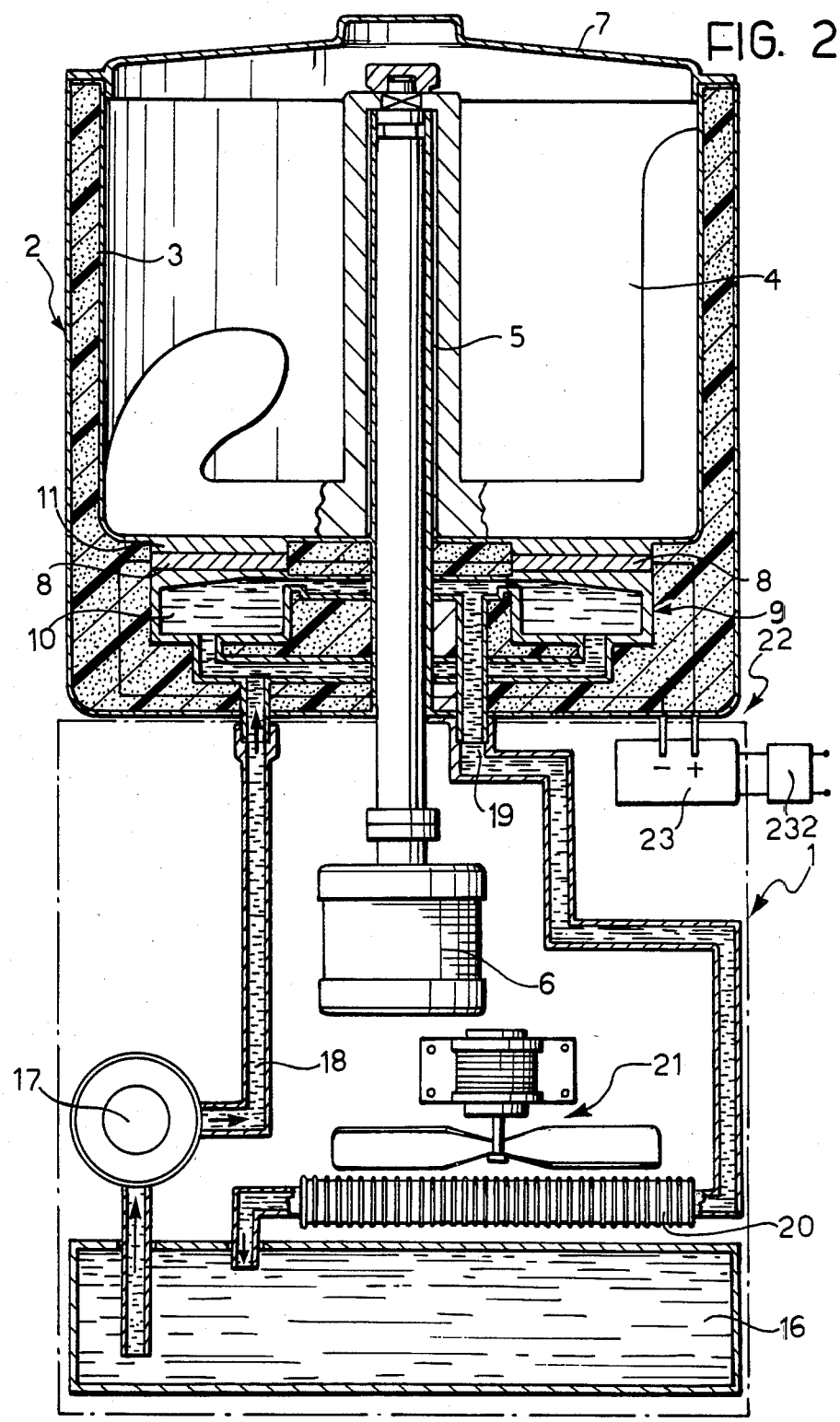
FIG. 2 illustrates a variant of FIG. 1.
Figure 4:
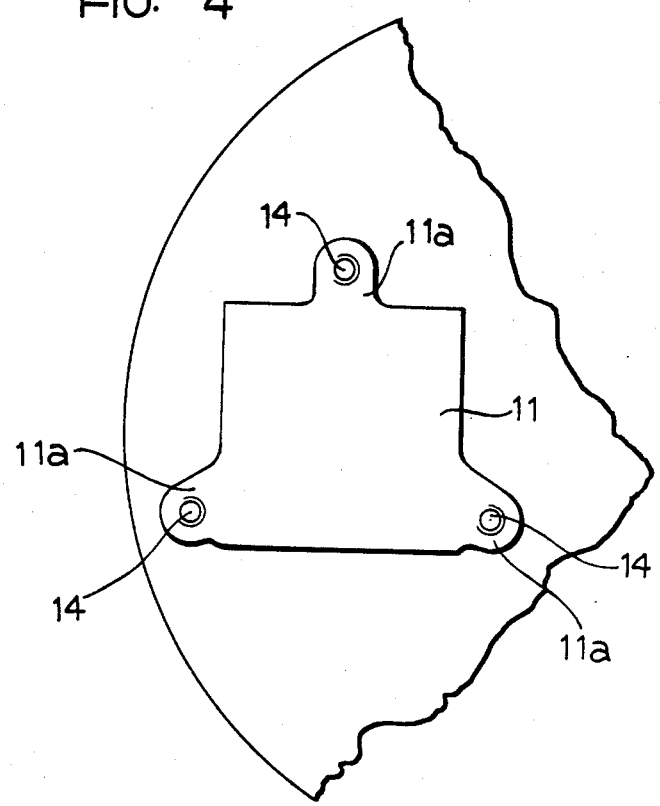
Figure 3:
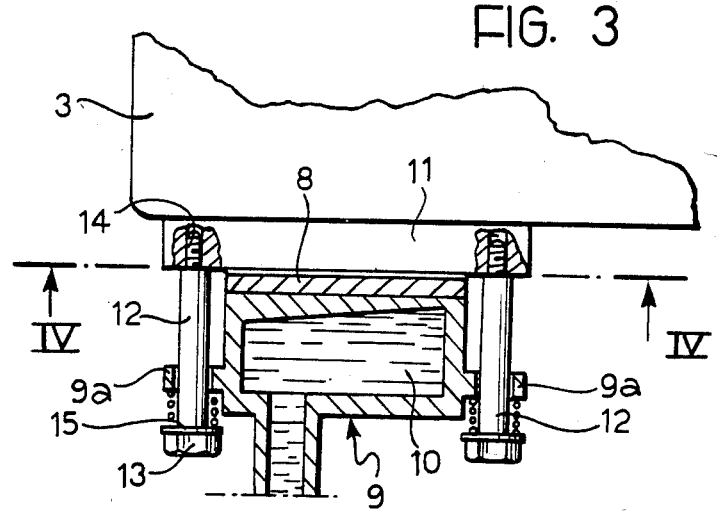
Figure 5:
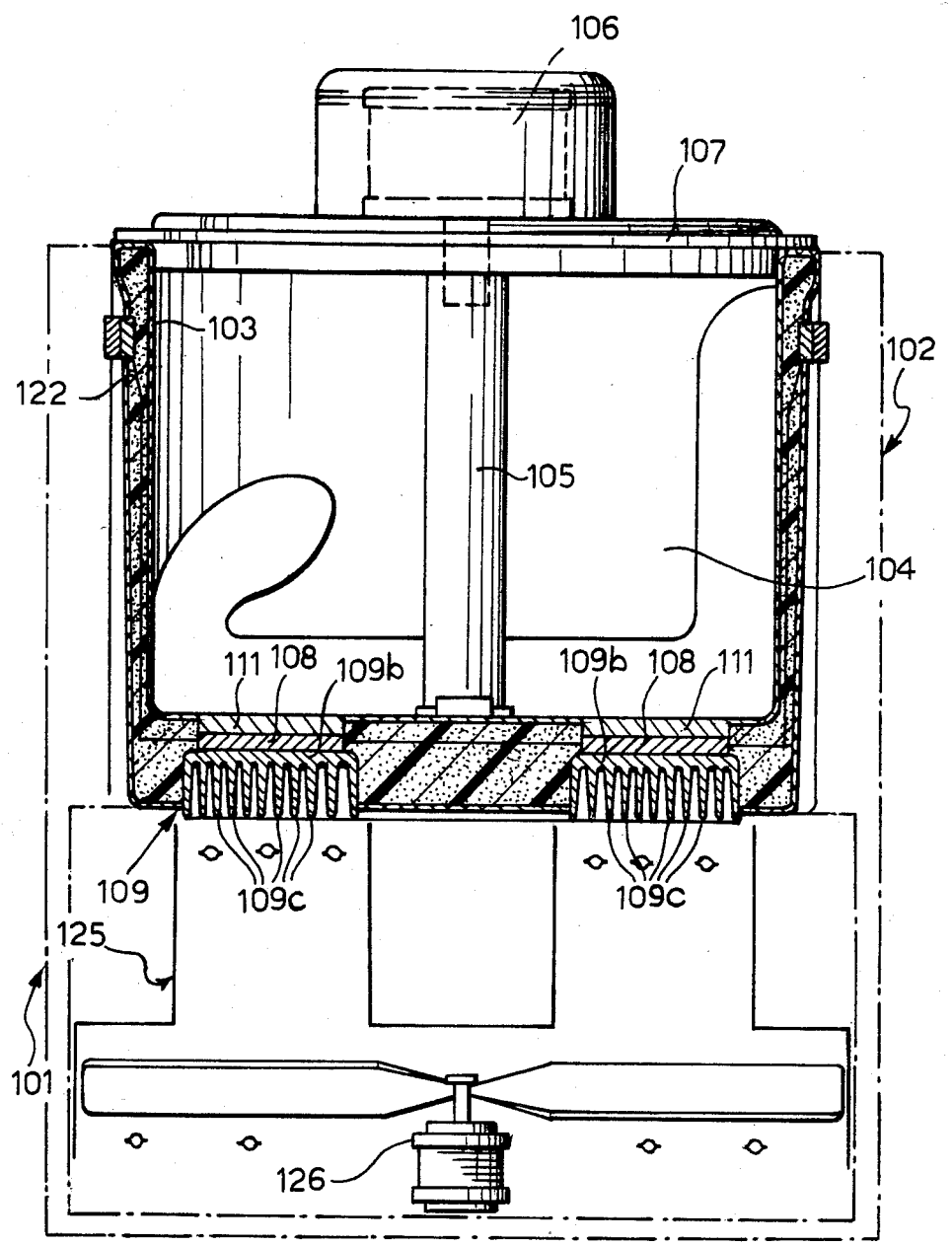
Figure 6:
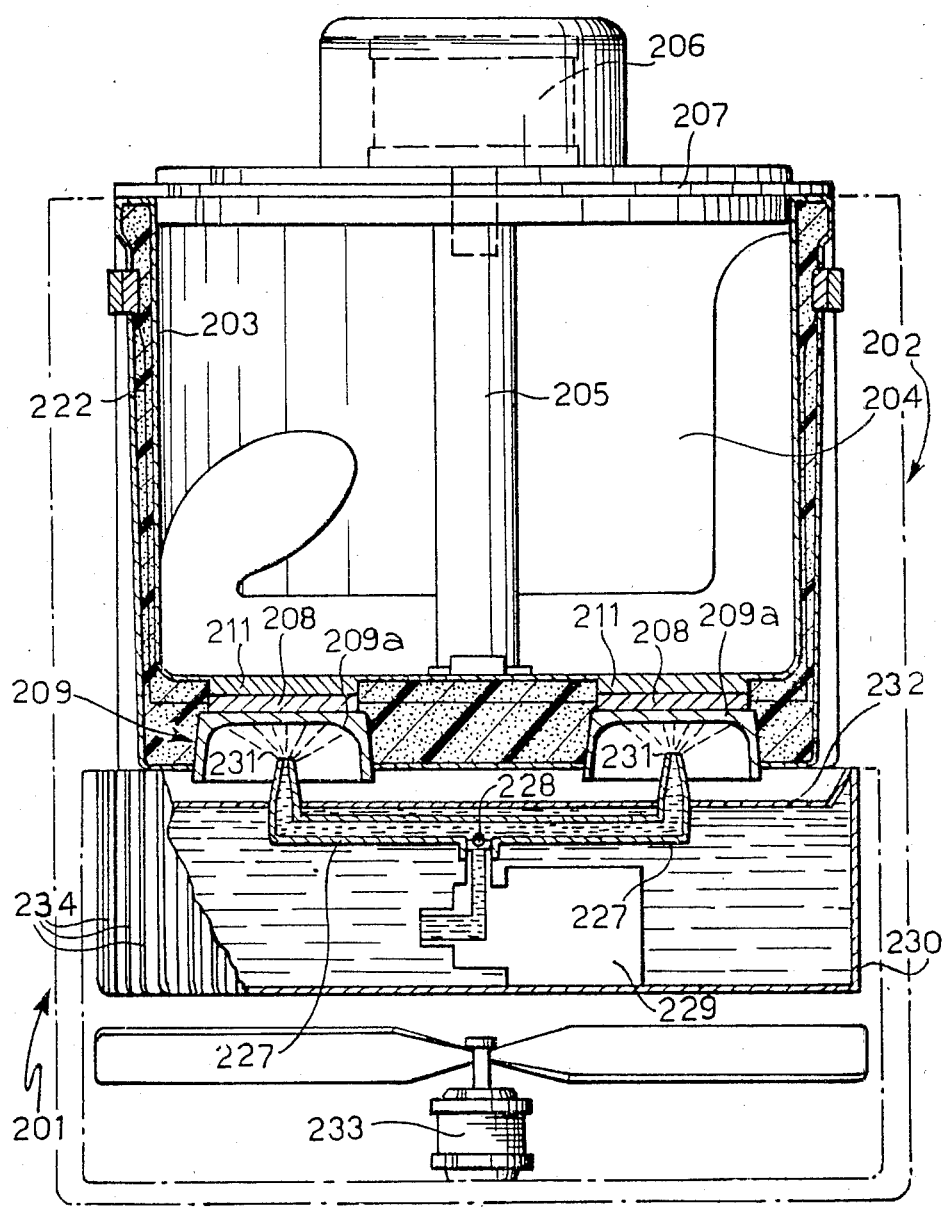

FIG. 3 illustrates a detail common to the ice cream making machines of FIGS. 1 and 2 in section and on an enlarged scale, FIG. 4 is a sectional view taken on the line IV—IV of FIG. 3, FIG. 5 is a sectional view of a second embodiment of the ice cream making machine according to the invention, and FIG. 6 is a sectional view of a third embodiment of the ice cream making machine according to the invention.

FIG. 1 is a sectional view of an ice cream making machine for domestic use comprising a base 1 (illustrated solely schematically in broken outline in FIG. 1) a casing 2 located upon the base 1 and a container 3 for the ice cream located within the casing 2. The container 3 is intended to be mounted in any known manner within the casing 2 so as to be easily removable from the casing in order to facilitate its cleaning. Reference numeral 4 indicates a scroll shaped stirrer rotatably mounted in the container 3 about a vertical axis 5. The scroll stirrer 4 is rotated by a geared motor 6 supported by a lid 7 located on the casing 2.

The ice cream making machine includes a refrigeration unit having three Peltier effect thermo-elements which are indicated 8. The thermo-elements 8 are located in angularly equidistantly spaced positions between the lower surface of the bottom wall of the container 3 and a heat dissipation member 9 constituted by a metal element, preferably of aluminium or copper, having an internal cavity 10 through which a coolant fluid flows. The lower surface of the bottom wall of the container 3 has a raised flat surface portion 11 (see also FIGS. 3, 4) in correspondence with each Peltier effect thermo-element 8. The surface of the heat dissipation member 9 facing the Peltier effect thermo-elements 8 also has three zones of contact 9b in correspondence with the three thermo-elements 8. In order to facilitate heat exchange, the surface area of each raised flat surface portion 11 and of each contact zone 9b of the heat dissipation member 9 is at least equal to that of the corresponding Peltier effect thermo-element 8.

With reference to FIG. 3, the heat dissipation member 9 has lugs 9a slidable on bolts 12 the axes of which are perpendicular to the bottom wall of the container 3. Each bolt 12 has its head 13 facing downwardly and its upper end engaged in a threaded hole 14 formed in a lug 11a of the corresponding raised flat surface portion 11 (see FIG. 4). Between the head 13 of each bolt 12 and the corresponding lug 9a of the heat dissipation member 9 a helical spring 15 is located which biasses the heat dissipation member 9 against the adjacent thermo-element 8. The springs 15 ensure perfect contact between the two sides of each Peltier effect thermo-element 8 and the surface portions 11 and 9b, automatically compensating for any thermal expansion.

The thermo-elements 8 and the heat dissipation member 9 are located, with the container 3, within the casing 2 and the empty spaces are filled with thermally insulating material such as, for example, expanded polyurethane. The casing 2, which is watertight, may be made of steel, aluminium or plastics material. The container 3 may be of stainless steel or treated aluminium. The bottom of the container 3 is preferably of aluminium. The bolts 12 are of thermally insulating material such as nylon.

The surfaces 11 and 9b which are in contact with the Peltier effect thermo-elements 8 are machined so as to be perfectly flat. The particular assembly of the Peltier effect thermo-elements 8 described above and the presence of the compensating springs 15 ensures that the surfaces are parallel to each other. Clearly there may be any number of thermo-elements 8.

In the case illustrated in FIG. 1, which relates to a domestic ice cream making machine, the cavity 10 within the heat dissipation member 9 for the coolant fluid is connected in a closed cooling circuit housed within the base 1 of the machine. This circuit includes a coolant fluid reservoir 16 communicating with the atmosphere, a pump 17 for circulating the fluid, a delivery duct 18 and a return duct 19 both communicating with the cavity 10 and a radiator 20 for cooling the fluid leaving the cavity 10, and which cooperates with a motor-driven fan 21. Reference numeral 22 indicates generally the electrical supply circuit for the Peltier effect thermo-elements 8, including a supply unit 23.

The embodiment illustrated in FIG. 2 differs from that of FIG. 1 solely in that the geared motor 6 for rotating the scroll stirrer 4 is connected to the lower end of the shaft of the stirrer and is located within the base 1 of the machine.

The ice cream making machine is intended to be provided with a timer, of known type (not illustrated) for predetermining the ice cream preparation time. This device may also be connected to the same circuit as that which supplies the geared motor 6. The coolant fluid circuit is protected by a thermostat (not illustrated) which stops the Peltier effect thermo-elements from operating when the temperature of the fluid leaving the radiator 20 exceeds a predetermined threshold, for example 45° C.

The aforesaid components have not been illustrated in the appended drawings since they are of known type and the manner in which they are used in the ice cream making machine according to the invention is clear to an expert in the art. Furthermore, the elimination of these components from the drawings makes these latter simpler and easier to understand.

In the case of an ice cream making machine for industrial use, the use of the cooling circuit illustrated in FIGS. 1, 2 may be dispensed with and the cavity 10 within the heat dissipation member 9 may be put in direct communication with the mains water supply.

Preferably the electrical supply circuit for the Peltier effect thermo-elements includes a polarity changeover switch 23a (see FIGS. 1, 2) of known type, in order to enable the container 3 for the ice cream also to be heated in order to allow the prior pasteurisation of the mixture which is to be made into ice cream or the preparation of other creamy foodstuffs.

The electric geared motor 6 preferably has several speeds (for example 3) to allow, in addition, the mixing of the ice cream as well as the prior beating of the mixture to be frozen, (at higher velocity) or the slow mixing of other food products.

FIG. 5 illustrates a second embodiment of the invention. In this figure, the parts corresponding to those of FIGS. 1, 2 are indicated by the same reference numerals, increased by 100.

The main difference with respect to the ice cream making machines of FIGS. 1 and 2 lies in the fact that, in this case, the heat dissipation member 109 is constituted by an annular metal element which is concentric with the axis 105 of the container and has a series of annular fins 109c concentric with each other.

The assembly of the heat dissipation member 109 beneath the container 103 is entirely identical to that illustrated with reference to FIGS. 3, 4 for the ice cream making machine of FIGS. 1, 2. A current of cooling air generated by a motor-driven fan 126 located within the base 101 is made to flow over the fins 109c. The current of cooling air is conveyed to the fins 109c through the cavity of an air ducting member 125.

FIG. 6 illustrates a third embodiment of the invention. In this figure the parts common to those of FIGS. 1 and 2 are indicated by the same reference numerals, increased by 200.

The main difference with respect to the ice cream making machine of FIGS. 1 and 2 lies in the fact that in this case the heat dissipation member 209 is constituted by an annular channel element disposed coaxially with the container 203 and having its cavity facing downwardly. The ends of three ducts 227 disposed in angular correspondence with the thermo-elements 208 project into the cavity of the heat dissipation member 209.

The three ducts 227, disposed in an array, are connected to the delivery 228 of a pump 229 for supplying coolant liquid from a reservoir 230.

The said ends of the ducts 227 form respective upwardly facing spray nozzles 231 through which the coolant liquid supplied by the pump 229 is sprayed onto the inner surface of the heat dissipation member 209.

The reservoir 230 has an upper perforated wall 232 for recovering the coolant liquid sprayed through the nozzles 231 and a finned side wall 234 over which a current of cooling air generated by a motor-driven fan 233 housed in the base 201 is forced in operation. In order to ensure effective heat exchange, the heat dissipation member 209 is normally of aluminium or copper.

The thermo-elements 208, the number of which may be different from that in the example illustrated, are connected to an electrical supply circuit generally indicated 222.

Naturally the principle of the invention remaining the same, constructional details and embodiments could be varied widely with respect to those described and illustrated purely by way of example, without thereby departing from the scope of the present invention.

I claim:

1. An ice cream making machine, comprising:
   a container for the ice cream;
   a stirrer located within the container;
   means for rotating the stirrer, and
   a refrigeration unit including heat dissipation means and a plurality of Peltier effect thermo-elements, each of said thermo-elements having a flat side in contact with a wall of the container and an opposite flat side in contact with said heat dissipation means,
   wherein the improvement consist in:
   the Peltier effect thermo-elements are located between a lower surface of a bottom wall of the container and said heat dissipation means;
   the lower surface of the bottom wall of the container has a plurality of raised flat surface portions, in correspondence with the Peltier effect thermo-elements,
   the heat dissipation means includes a member which provides a surface having a plurality of flat zones in contact with the Peltier effect thermo-elements, each of said raised flat surface portions and each of said flat contact zones having respective surface areas at least equal to the surface area of each side of each Peltier effect thermo-element,
   the heat dissipation member is connected to the container and is slidable in a direction perpendicular to the bottom wall of the container, and
   resilient means for urging the heat dissipation member against the bottom wall of the container to clamp said Peltier effect thermo-elements respectively between said raised flat surface portions and said flat contact zones of the heat dissipation member.

2. An ice cream making machine as defined in claim 1, including a plurality of pins having lower enlarged heads, the pins projecting beneath the raised flat surface portions and the heat dissipation member being slidable on said pins, the resilient means being constituted by a series of helical springs, each of said springs located on a respective said pin between an abutment surface of the heat dissipation member and said lower enlarged head of the respective pin.

3. A ice cream making machine as defined in claim 2, wherein the pins are constituted by bolts each threadably having one end engaged in a corresponding threaded hole in the bottom wall of the container and its opposite end having the respective said lower enlarged head against which the respective helical spring bears.

4. An ice cream making machine as defined in claim 1, wherein the Peltier effect thermo-elements are located in equi-angularly spaced apart positions.

5. An ice cream making machine as defined in claim 1, wherein the heat dissipation member has an inner cavity through which a coolant fluid flows in use of the machine.

6. An ice cream making machine as defined in claim 5, wherein the inner cavity of the heat dissipation member is connected in a closed cooling circuit including a coolant fluid reservoir, a pump for circulating the coolant fluid and a radiator for cooling the coolant fluid.

7. An ice cream making machine as defined in claim 5, including means for connecting the inner cavity of the heat dissipation member to a main water supply.

8. An ice cream making machine as defined in claim 1, including a casing within which the container for the ice cream, the Peltier effect thermo-elements and the heat dissipation member are located, defining with said casing interspaces which are filled with thermally insulating material.

9. An ice cream making machine as defined in claim 8, wherein the container for the ice cream is removable from the casing.

10. An ice cream making machine as defined in claim 1, including a timer for controlling the ice cream preparation time.

11. An ice cream making machine as defined in claim 6, including a thermostat for stopping the operation of the Peltier effect thermo-elements when the temperature of the coolant fluid exceeds a predetermined threshold.

12. An ice cream making machine as defined in claim 1, wherein there is further provided an electrical supply circuit for the Peltier effect thermo-elements including a polarity changeover switch.

13. An ice cream making machine as defined in claim 1, wherein the means for rotating the stirrer include a multi-speed electric motor.

14. An ice cream making machine as defined in claim 5, wherein the heat dissipation member has a plurality of fins and including a motor-driven fan for forcing a current of cooling air over the fins.

15. An ice cream making machine as defined in claim 14, including cooling air ducting means interposed between the fan and the fins of the heat dissipation member.

16. An ice cream making machine as defined in claim 14, wherein the heat dissipation member is annular and is coaxial with the container, the fins being annular and concentric with each other.

17. An ice cream making machine as defined in claim 1, wherein the heat dissipation member has an associated cooling unit including a reservoir, a pump for supplying coolant liquid from the reservoir and spray nozzles facing the heat dissipation member to which coolant is delivered by the pump.

18. An ice cream making machine as defined in claim 17, wherein the heat dissipation member has an annular channel which is coaxial with the container, the cavity of the channel facing downwardly.

19. An ice cream making machine as defined in claim 18, wherein the spray nozzles are arranged in a ring at the ends of respective supply ducts connected to said pump to receive coolant liquid therefrom.

20. An ice cream making machine as defined in claim 17, wherein the reservoir is formed by a receptacle located beneath the heat dissipation member, said receptacle having an upper perforated wall for recovering the coolant liquid sprayed through the nozzles.

21. An ice cream making machine as defined in claim 20, wherein the reservoir has a side wall with fins and the reservoir has an associated motor-driven fan for cooling the coolant liquid.

* * * * *

UNITED STATES PATENT AND TRADEMARK OFFICE
CERTIFICATE OF CORRECTION

PATENT NO. : 4,540,288

DATED : September 10, 1985

INVENTOR(S) : Alberto Pandolfi

It is certified that error appears in the above-identified patent and that said Letters Patent are hereby corrected as shown below:

Column 5, line 52, after "end" insert --threadably--; and

Column 5, line 54, delete "said".

Signed and Sealed this

Eighteenth Day of February 1986

[SEAL]

Attest:

*Attesting Officer*

DONALD J. QUIGG

*Commissioner of Patents and Trademarks*